(12) United States Patent
Srinivasan et al.

(10) Patent No.: US 11,848,814 B2
(45) Date of Patent: Dec. 19, 2023

(54) ROOT CAUSE INCIDENT DETECTION USING AN ALARM CORRELATION ENGINE

(71) Applicant: T-Mobile Innovations LLC, Overland Park, KS (US)

(72) Inventors: Srikrishna Srinivasan, Sammamish, WA (US); Yanbing Su, Frisco, TX (US); Jia Yan, Plano, TX (US); Faisal Waris, Rochester Hills, MI (US); Pradeep Christopher Cruz, Issaquah, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 19 days.

(21) Appl. No.: 17/455,354

(22) Filed: Nov. 17, 2021

(65) Prior Publication Data

US 2023/0155881 A1 May 18, 2023

(51) Int. Cl.
*H04L 41/0631* (2022.01)
*H04L 43/062* (2022.01)
*H04L 43/045* (2022.01)

(52) U.S. Cl.
CPC ........ *H04L 41/0631* (2013.01); *H04L 43/045* (2013.01); *H04L 43/062* (2013.01)

(58) Field of Classification Search
CPC .. H04L 41/0631; H04L 43/045; H04L 43/062
USPC ......................................................... 709/224
See application file for complete search history.

(56) References Cited

U.S. PATENT DOCUMENTS

| | | | |
|---|---|---|---|
| 7,904,962 B1* | 3/2011 | Jajodia | H04L 63/1425 709/224 |
| 2002/0093915 A1* | 7/2002 | Larson | H04L 63/0272 370/252 |
| 2007/0192474 A1* | 8/2007 | Decasper | H04L 67/306 709/223 |
| 2017/0353991 A1* | 12/2017 | Tapia | H04L 41/0631 |
| 2019/0132191 A1* | 5/2019 | Mann | G06F 11/008 |
| 2022/0029876 A1* | 1/2022 | Mercian | H04L 41/0654 |
| 2022/0156154 A1* | 5/2022 | Varnavas | G06F 11/3409 |
| 2022/0158894 A1* | 5/2022 | Moulik | H04L 41/0631 |

* cited by examiner

*Primary Examiner* — Meng Vang
(74) *Attorney, Agent, or Firm* — SHOOK, HARDY & BACON L.L.P.

(57) ABSTRACT

In various examples, description data may be used by an engine to correlate a subset of alarms representing a network incident. A machine learning model may then be used to predict a likelihood that one or more of the alarms within the subset is a root cause of the network incident. This root cause may then be displayed on a graphical user interface. As a result, alarm fatigue experienced by network administrators may be reduced.

12 Claims, 7 Drawing Sheets

US 11,848,814 B2

ROOT CAUSE INCIDENT DETECTION USING AN ALARM CORRELATION ENGINE

SUMMARY

The present disclosure is directed, in part, to systems and methods for root cause detection of an incident using an alarm correlation engine, substantially as shown in and/or described in connection with at least one of the figures, and as set forth more completely in the claims.

Alarm management systems play a critical role in monitoring the health of a communications network, such as a telecommunications network. These type of networks are often complex in nature and may generate a tremendous number of alarms in any given time period, representing various incidents, such as hardware, configuration, or software failures. Network administrators monitoring alarm management systems for these networks may, in turn, experience alarm overload. For example, the incoming rate of network alai ns for any given time period may become excessive so that an administrator may not have the ability to timely identify which of the multitude of alarms represents a root cause of an incident as opposed to a symptom of the root cause, which may result in further degradation of the network.

Disclosed approaches may use an engine to analyze description data associated with a set of alarms from a plurality of nodes of a communication network, representing a plurality of network incidents, and determine a subset of alarms that represent a network incident. Upon identifying the subset of alarms that represent a network incident, the subset may be applied to a machine learning model trained to predict a likelihood that one or more alarms of the subset is a root cause of the network incident. One or more alarms of the subset may be selected based at least on the likelihood that the one or more alarms is the root cause of the network incident. Once the likely root cause of the network incident has been selected, this root cause may be communicated for display in a graphical user interface. In addition, disclosed approaches may update parameters of the machine learning model based on the one or more alarms selected and the one or more root cause predictions using the actual determined root cause of the incident in order to further train the machine learning model to accurately predict a root cause of an incident. In these ways, the mean time for detecting a root cause of a network incident is significantly reduced, which can prevent more serious network incidents, such as a network failure. In addition, corresponding operator time and expense in conjunction with analyzing potential network alarms can be reduced.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Illustrative embodiments of the present invention are described in detail below with reference to the attached figures, which are intended to be exemplary and non-limiting, wherein.

DETAILED DESCRIPTION

Figure 1:
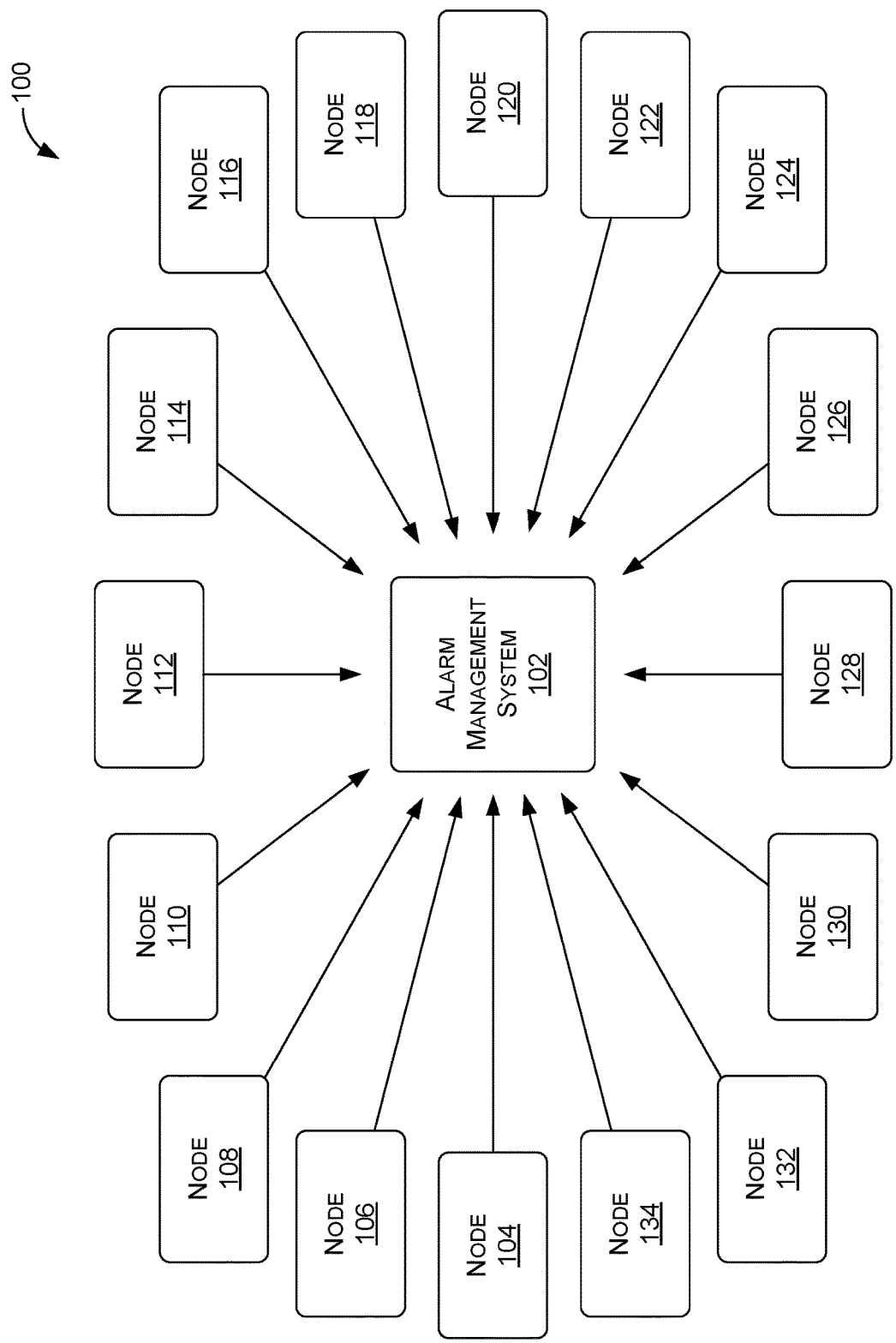
FIG. 1 depicts an example of a network environment in accordance with embodiments of the present disclosure.

Systems and methods are disclosed related to root cause alarm detection of an incident using an alarm correlation engine. The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In certain aspects, a method in a communication network is provided. In embodiments, a set of alarms from a plurality of nodes may be received. In other embodiments, the set of alarms may represent a plurality of incidents. Using an engine, a first subset of the set of alarms representing a plurality of incidents may be determined by analyzing description data associated with the set of alarms. In embodiments, the first subset of the set of alarms may be applied to a machine learning model to predict a likelihood that one or more of the first subset of alarms is a root cause of the incident. One or more alarms of the first subset of the set of alarms may be selected based on the likelihood that said one or more alarms is the root cause of the incident. In still further embodiments, the root cause of the incident may be communicated for display in a graphical user interface.

In other aspects, a system in a communication network is provided. The system may include one or more processors and one or more computer storage hardware devices storing computer-usable instructions. The computer-usable instructions may cause the one or more processors to receive a set of alarms from a plurality of nodes. In embodiments, the set of alarms may represent a plurality of network incidents. In other embodiments, the computer-usable instructions may cause the one or more processors to determine a first subset of the set of alarms representing an incident by analyzing description data associated with the set of alarms. In further embodiments, the computer-usable instructions may cause the one or more processors to apply the first subset of the set of alarms to a machine learning model trained to predict a likelihood that one or more alarms of the first subset is a root cause of the incident. The computer-usable instructions may further cause the one or more processors to select one or more alarms of the first subset of the set of alarms based at least on the likelihood that said one or more alarms is the root cause of the incident. In addition, the computer-usable instructions may cause the one or more processors to communicate the root cause of the incident for display in a graphical user interface.

In further aspects, a method in a communication network is provided. In embodiments, a set of alarms from a plurality of nodes may be received. In other embodiments, the set of alarms may represent a plurality of incidents. Using an engine, a first subset of the set of alarms representing a plurality of incidents may be determined by analyzing description data associated with the set of alarms. In embodiments, the first subset of the set of alarms may be applied to a machine learning model to generate one or more prediction regarding a root cause of the incident. In further embodiments, one or more of the first subset of the set alarms may be selected based at least on the one or more predictions. In still further embodiments, parameters of the machine learning may be updated based on the selecting and the one or more predictions.

Advantageously, by providing methods and systems in a communication network that use an alarm correlation engine, a root cause of a network incident can be more easily identified thereby resulting in a significant reduction in the mean time for resolving a network problem, and a machine learning model that can more accurately predict one or more alarms that are a root cause of an incident.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 700 shown in FIG. 5. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3 G, 4 G, LTE, 5 G, mMIMO) as discussed hereinafter.

The terms "user equipment," "UE," and "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5 G and having backward compatibility with prior access technologies, current UE capable of using 5 G and lacking backward compatibility with prior access technologies, and legacy UE that is not capable of using 5 G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1 ½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3 G, 4 G, 5 G, and/or 802.11 protocols and techniques.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

FIG. 1 depicts a high-level example of a network environment 100 in accordance with embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 may include an alarm management system 102. In some embodiments, the network environment 100 may be a telecommunication network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition, the network environment 100 may be utilized in a variety of manners, such as a single network, multiple networks, or as a network of networks, but, ultimately, is shown as simplified as possible to avoid the risk of confusing other aspects of the present disclosure.

The alarm management system 102 may receive alarms from a multitude of the nodes 104-134. Each of the nodes 104-134 may be any component of a communication network, including, for example, an IP router, or a component from an evolved packet core, such as a Mobile Management Entity (MME), a Telephony Application Server (TAS), a Packet Data Network Gateway (PGW), a Home Subscriber Server (HSS), a Policy and Charging Rules Function (PCRF), an Enhanced Serving Mobile Location Center (E-SMLC), or a Gateway Mobile Location Center (GMLC), or a component from a 5 G core (5 GC). In other examples, one or more of the nodes 104-134 may be any component of an Enhanced 911 (E911) network, such as a Public Safety Answering Point (PSAP), an Enhanced Serving Mobile Location Center (E-SMLC), a Gateway Mobile Location Center (GMLC), an Access & Mobility Management Function (AMF), a Location Management Function (LMF), or a Mobile Positioning Center (MPC). One or more of nodes 104-134 may also be components of a radio access network, such a remote radio head, an eNodeB, a gNodeB, a baseband unit, or a mobile switching unit. The network environment 100 may include any communication network providing voice and/or data service(s), such as, for example, a 1x circuit voice, a 3 G network (e.g., CDMA, CDMA 2000, WCDMA, GSM, UMTS, a 4 G network (LTE, WiMAX, HSDPA), 5 G, or a 6 G network.

Having described network environments 100 and components operating therein, it will be understood by those of ordinary skill in the art that the network environment 100 is but an example of a suitable network and is not intended to limit the scope of use or functionality of aspects described herein. Similarly, network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 is an example, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1 it will be appreciated that some aspects may include a plurality of devices and/or components such that FIG. 1 should not be considered as limiting the quantity of any device and/or component.

Figure 2:
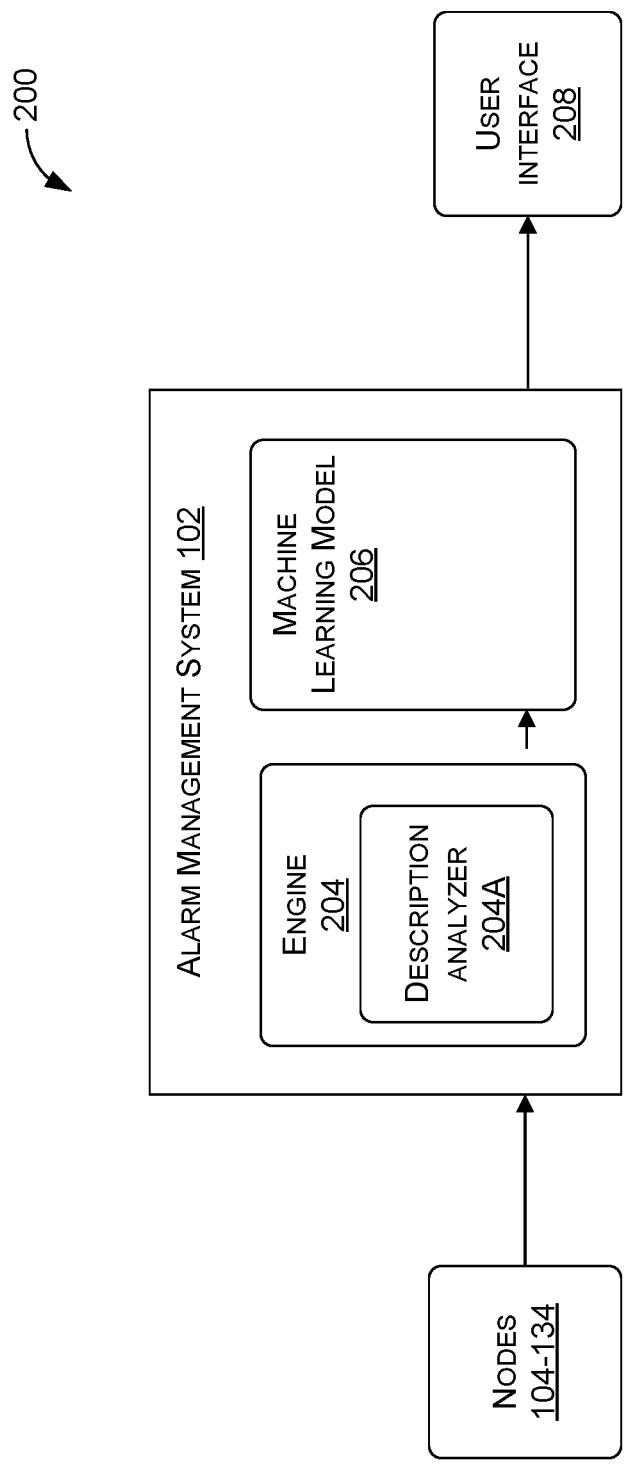
FIG. 2 depicts an example of a network environment in accordance with embodiments of the present disclosure.
Figure 3:
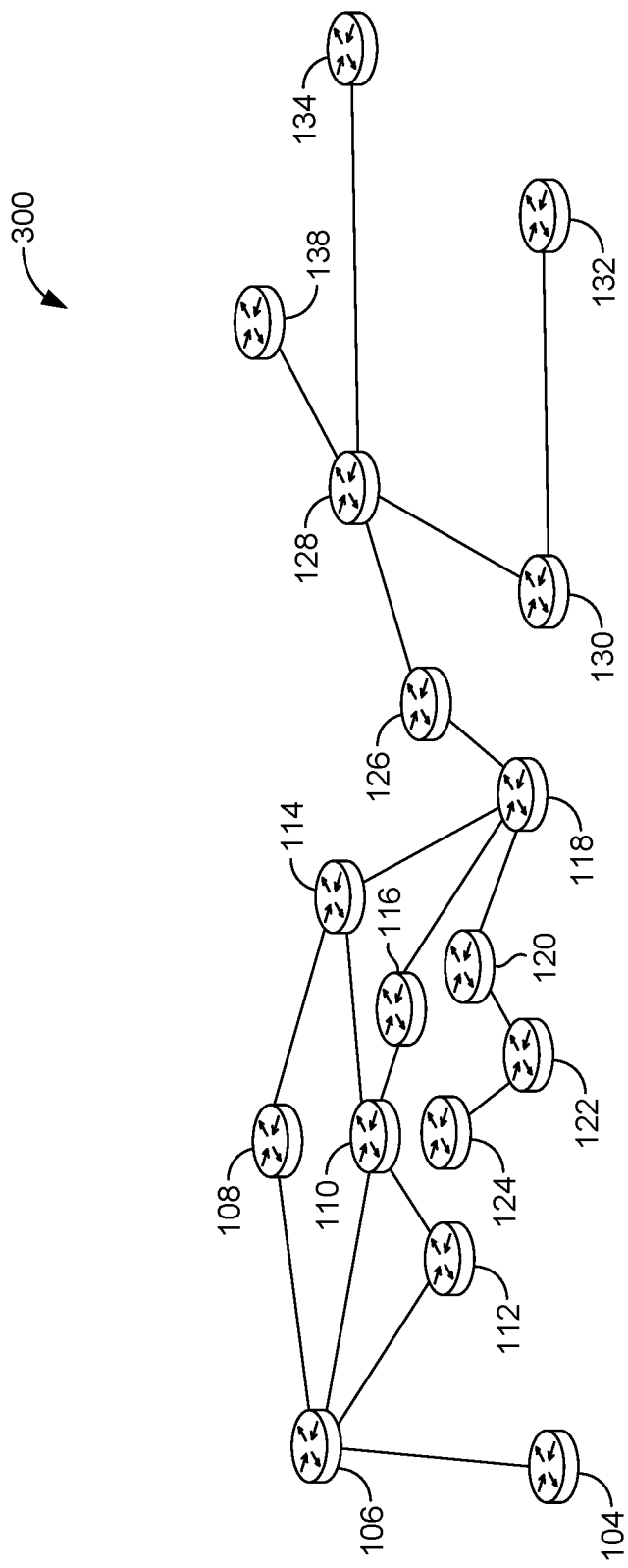
FIG. 3 illustrates a plurality of nodes in a network environment in accordance with embodiments of the present disclosure.

FIG. 2 illustrates another example of a network environment 200 in certain embodiments. The network environment 200 may include the nodes 104-134, the alarm management system 102, a machine learning model 206, and a user interface 208. FIG. 3 illustrates the nodes 104-134 in certain embodiments of a communication network 300. As FIG. 3 depicts, the nodes 104-134 of the communication network 300 may have various connections to one another and may be physically distant from one another. Referring back to FIG. 2, in embodiments, the alarm management system 102 may include an engine 204, and the engine 204 may include a description analyzer 204A. The nodes 104-134 of the network environment 200 may send various alarms to the alarm management system 102. The number of alarms may be significant in number and may represent a plurality of incidents within a communication network. In certain embodiments, each incident may elicit an alarm from a node that is a root cause of the incident and may also elicit alarms from a plurality of nodes that are symptoms of the root cause of the incident.

In embodiments, alarms sent from the nodes 104-134 in a communication network to the alarm management system 102 may include description data. In still further embodiments, the description data may be approximately 1000 to 2000 characters long and include a description of an event, a priority of the event, and which nodes have been impacted by the event. In other embodiments, alarms sent from the nodes 104-134 to the alarm management system 102 may include description data with one or more of the following descriptors: rdbNoMesgFromProb_Major; rdbProbeConn_ Critical; LowMemory; probeFilterClientDisconnect_hrr; InterfaceDown; AggregatorDegraded; Syslog_Cisco_LvL_ ROUTING-OSPF-5-ADJCHG; cefcPowerStatusChange; bfd_sessions; AggregatorLinkDegraded; AggregatorLinkDown; InterfaceErrors; NodeDown; SNMPLinkUpDownFlapping; ConnectionDown; or Multilink_degraded. The description analyzer 204A of the engine 204 may perform text mining on the alarms sent from nodes 104-134 to the alarm management system 102 to determine similarities between the received alarms. In embodiments, these similarities may be determined using the Jaro-Winkler algorithm with Bipartite Matching.

In other embodiments, the alarms sent from the nodes 104-134 to the alarm management system 102 may include description data in the form of a textual-string identifying the alarm and an Internet Protocol (IP) address. In embodiments, each of these IP addresses may represent the IP address of the node sending the alarm and may be converted by the engine 204 and/or the description analyzer 204A into the name of the node that the address represents. For example, a given IP address may be converted into a textual string delineating the name of the node. The description analyzer 204A of the engine 204 may further perform text mining on these textual strings describing the names of the nodes as a further aid in determining the similarities between alarms. In embodiments, the description analyzer 204A of the engine 204, using the description data included in the alarms sent from the nodes 104-134 to the alarm management system 102 may determine a subset of the set of alarms received that represents one of the plurality of incidents.

Figure 4:
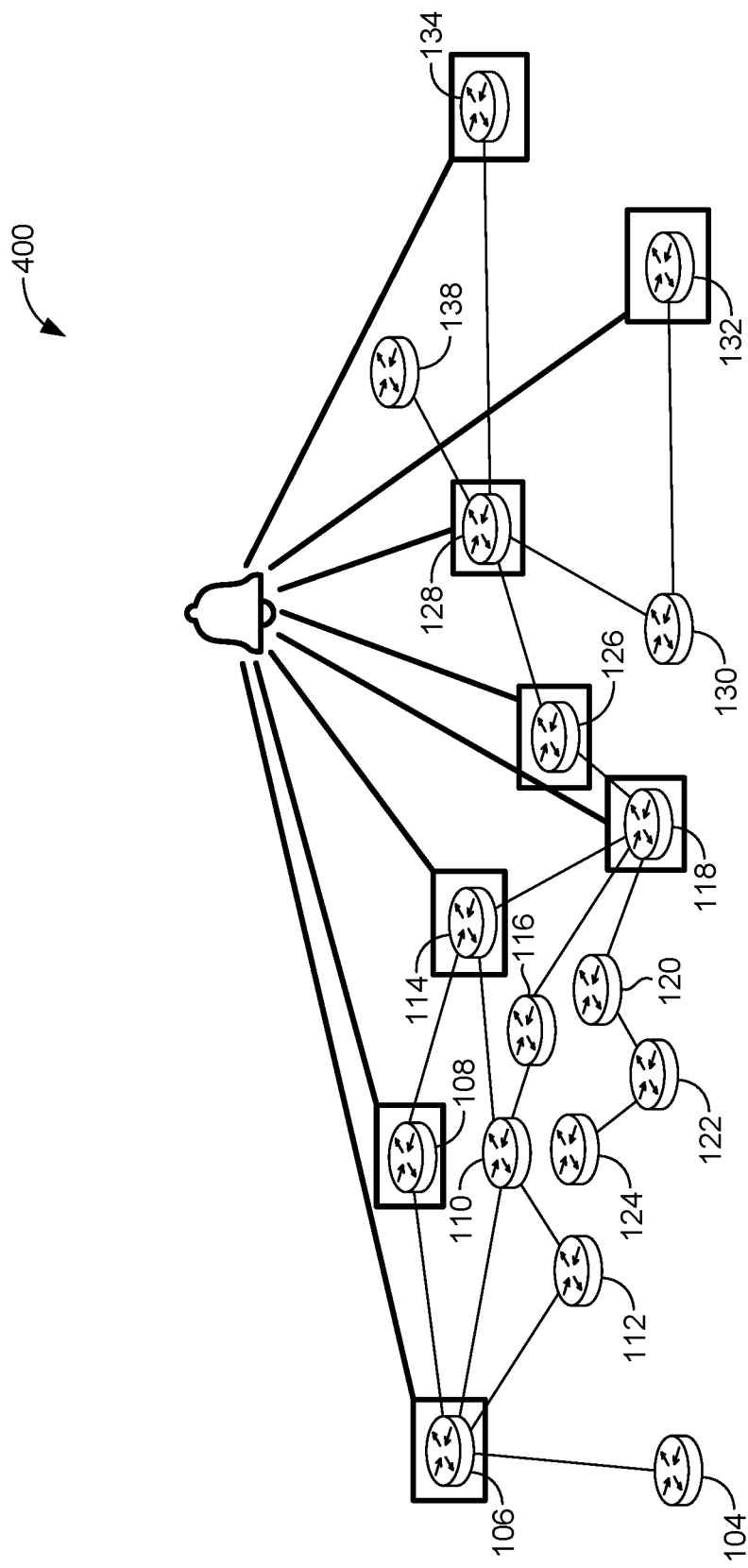
FIG. 4 is an illustration of a graphical user interface depicting a multitude of alarms in a network environment.

In certain embodiments, the description analyzer 204A may use the names of the nodes that have been generated from the received IP addresses to determine the subset of the set of alarms received that represents one of the plurality of incidents. For example, the description analyzer 204A may use the textual-strings associated with the received set of alarms and/or the Internet Protocol (IP) addresses included with the received set of alarms from the nodes 104-134 to determine that the subset of alarms representing one incident includes the nodes 106, 108, 114, 118, 126, 128, 132, and 134. FIG. 4 illustrates a graphical user interface depicting a communication network 400 and the nodes 106, 108, 114, 118, 126, 128, 132, and 134 representing one incident. As FIG. 4 illustrates, network administrators may quickly experience alarm overload as incidents and the plethora of alarms that they trigger occur in the network.

Referring back to FIG. 2, once the subset of the set of alarms for an incident has been determined, this subset is provided to the machine learning model 206. The machine learning model 206 may be any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvlutional, generative adversarial, liquid state machine, etc.), and/or other types of machine learning models.

As an example, such as where the machine learning model 206 includes a convolution neural network (CNN), the CNN may include any number of layers. One or more of the layers may include an input layer. The input layer may hold values associated with the sample data 114 (e.g., before or after post-processing). One or more layers may include convolutional layers. The convolutional layers may compute the output of neurons that are connected to local regions in an input layer, each neuron computing a dot product between their weights and a small region they are connected to in the input volume. A result of the convolutional layers may be another volume, with one of the dimensions based on the number of filters applied (e.g., the width, the height, and the number of filters, such as 32×32×12, if 12 were the number of filters).

One or more layers may include deconvolutional layers (or transposed convolutional layers). For example, a result of the deconvolutional layers may be another volume, with a higher dimensionality than the input dimensionality of data received at the deconvolutional layer. One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down sampling operation along the spatial dimensions (e.g., the height and the width), which may result in a smaller volume than the input of the pooling layer (e.g., 16×16×12 from the 32×32×12 input volume). One or more of the layers may include one or more fully connected layer(s). Each neuron in the fully connected layer(s) may be connected to each of the neurons in the previous volume. The fully connected layer may compute class scores, and the resulting volume may be 1×1× number of classes. In some examples, the CNN may include a fully connected layer(s) such that the output of one or more of the layers of the CNN may be provided as input to a fully connected layer(s) of the CNN. In some examples, one or more convolutional streams may be implemented by the CNN(s), and some or all of the convolutional streams may include a respective fully connected layer(s).

In some non-limiting embodiments, the CNN(s) may include a series of convolutional and max pooling layers to facilitate image feature extraction, followed by multi-scale dilated convolutional and up-sampling layers to facilitate global context feature extraction. Although input layers, convolutional layers, pooling layers, ReLU layers, and fully connected layers are discussed herein with respect to the CNN(s), this is not intended to be limiting. For example, additional or alternative layers may be used in the CNN(s), such as normalization layers, SoftMax layers, and/or other layer types.

In embodiments, different orders and numbers of the layers of the CNN may be used depending on the embodiment. In other words, the order and number of layers of the CNN(s) is not limited to any one architecture. In addition, some of the layers may include parameters (e.g., weights and/or biases), such as the convolutional layers and the fully connected layers, while others may not, such as the ReLU layers and pooling layers. In some examples, the parameters may be learned by the CNN(s) during training. Further, some of the layers may include additional hyper-parameters (e.g., learning rate, stride, epochs, etc.), such as the convolutional layers, the fully connected layers, and the pooling layers, while other layers may not, such as the ReLU layers.

The parameters and hyper-parameters are not to be limited and may differ depending on the embodiment.

Figure 5:
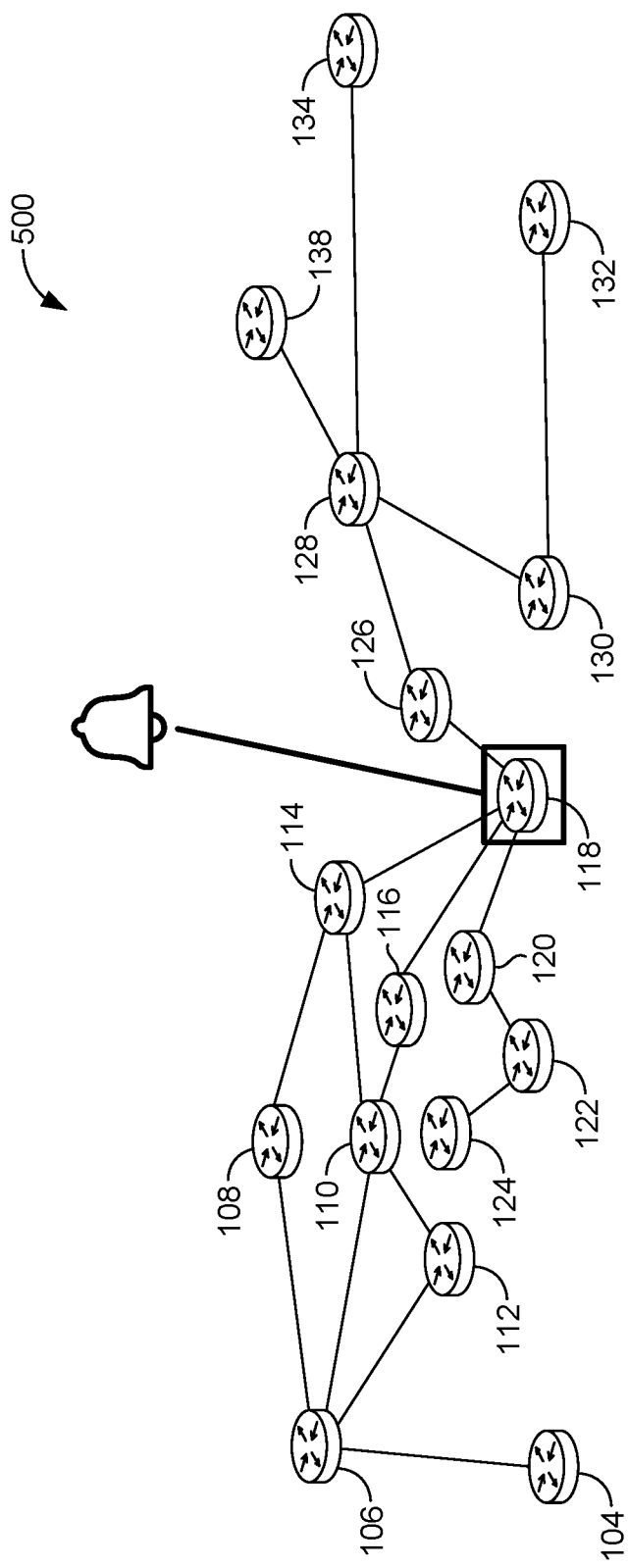
FIG. 5 is an illustration of a graphical user interface in a network environment in accordance with some embodiments of the present disclosure.

In embodiments, the machine learning model 206 may be trained to predict a likelihood that one or more of the alarms of the first subset is a root cause of the incident. For example, the machine learning model 206 may be equipped with one or more weighted lists representing the likelihood that an alarm is a root cause of an incident. The machine learning model 206 in certain embodiments may select one or more alarms of the subset of alarms based at least on the likelihood that the one or more alarms is the root cause of the incident. For example, in embodiments, the machine learning model may determine that an alarm sent from the node 118 to the alarm management system 102 has the highest likelihood of being the root cause of the other alarms within the subset. In further embodiments, the machine learning model 206 may communicate to the user interface 208 for display the one or more alarms selected as the likely root cause of the subset of alarms. FIG. 5 illustrate a graphical user interface 500 in accordance with certain embodiments. For example, as illustrated in FIG. 5, once the machine learning model 206 determines that the alarm generated by node 118 is the likely root cause of the subset of alarms generated by the nodes 106, 110, 114, 118, 126, 128, 132, and 134, the machine learning model 206 may communicate for display in the graphical user interface 500 the node 118. In this way, network administrators may be able to pinpoint and more clearly visualize the root cause of a multi-alarm-generating incident. In other embodiments, the actual problem associated with the node that is the root cause of an incident is communicated for display in the graphical user interface 500.

In further embodiments, the root cause of each of the plurality of incidents is determined. For example, a set of alarms may be received from a plurality of nodes, representing a plurality of incidents. For each incident, an engine may be used to determine a subset of the set of alarms representing the incident by analyzing description data associated with the set of alarms. The subset of the set of alarms representing each incident may then be applied to a machine learning model trained to predict a likelihood that one or more alarms of each subset is a root cause of an incident. One or more alarms of each subset may be then be selected based at least on the likelihood that the one or more alarms is the root cause of an incident. The one or more alarms representing the root cause for each incident may then be communicated for display in a graphical user interface.

In still further embodiments, once a root cause for each of a plurality of incidents has been determined, a shortest path distance between the root cause of each incident may be computed. In examples, this shortest path distance may be computed using Dijkstra's algothrim and may be communicated for display on the graphical user interface 208 thereby further enhancing the visual depiction of the relationship between the root causes of a plurality of incidents while reducing the risk of alarm fatigue.

In certain embodiments, ground truth data in the form of the actual root cause of an incident may be used to further train the machine learning model 206. For example, where the actual root cause of an incident diverges from the root cause predicted by the machine learning model 206, the actual root cause of the incident may be used to update parameters—e.g., weights and biases—of the machine learning model 206 using one or more loss functions. In other examples, where the actual root cause of an incident conforms with the root cause predicted by the machine learning model 206, the actual root cause of the incident may still be used to update parameters—e.g., weights and biases—of the machine learning model 206. Updated parameters in the form of the actual root cause of various incidents may continue to be supplied to the machine learning model 206 until the machine learning model's level of accuracy in predicting a root cause of an incident falls within an acceptable level.

In still further embodiments, ground truth in the form of the actual root cause for each incident of a plurality of incidents occurring within a given time period in a communication network may be used to further train the machine learning model 206. For example, where the actual root cause of one or more incidents diverges from the root cause predicted by the machine learning model 206, the actual root cause of the one or more incidents may be used to update parameters—e.g., weights and biases—of the machine learning model 206 using one or more loss functions. In other examples, where the actual root cause of one or more incidents conform with the root cause predicted by the machine learning model 206, the actual root cause of the one or more incidents may be used to update parameters—e.g., weights and biases—of the machine learning model 206.

Figure 6:
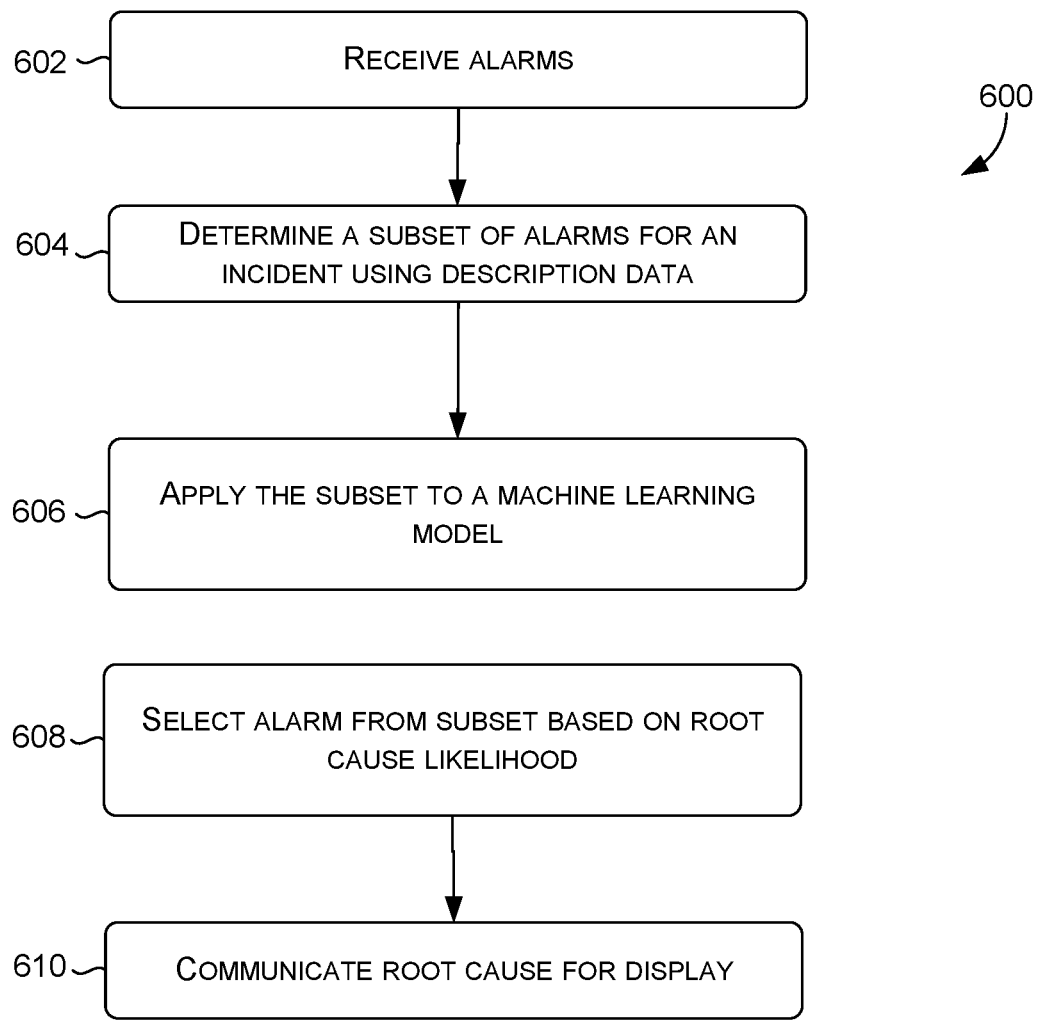
FIG. 6 is a flow diagram showing a method in accordance with some embodiments of the present disclosure.

FIG. 6 depicts a flow diagram of an example method 600 for root cause incident detection in a communication network in accordance with implementations of the present disclosure. The method 600, at block 602, includes receiving alarms. In examples, the alarm management system 102 may receive a set of alarms from a plurality of nodes, such as the nodes 104-134, representing a plurality of incidents. The method, at block 604, includes determining a subset of alarms for an incident description data. In examples, the description analyzer 204A of the engine 204 of the alarm management system 102 may determine a subset of the set of alarms representing an incident by analyzing description data associated with the set of alarms. In embodiments, this description data may be textual strings representing the alarms and IP addresses representing the nodes, such as the nodes 104-132, which have precipitated the alarms. The method, at block 606, includes applying the subset of alarms to the machine learning model. For example, the engine 204 or the description analyzer 204A may apply the subset of alarms representing an incident to the machine learning model 206. The machine learning model 206 may be trained to predict a likelihood that one or more alarms of the subset is a root cause of the incident. The method, at block 608, includes selecting an alarm from the subset based on the likelihood that the alarm is a root cause of an incident. For example, the machine learning model 206 may select one or more alarms of the subset of alarms based at least on the likelihood that said one or more alarms is the root cause of the incident. In embodiments, the machine learning model 206 may be equipped with one or more weighted lists representing the likelihood that an alarm is a root cause of an incident. The method, at block 610, includes communicating the root cause for display. For example, the machine learning model 206 or another component of the alarm management system 102 may communicate for display in the graphical user interface 208 the root cause of the incident.

Figure 7:
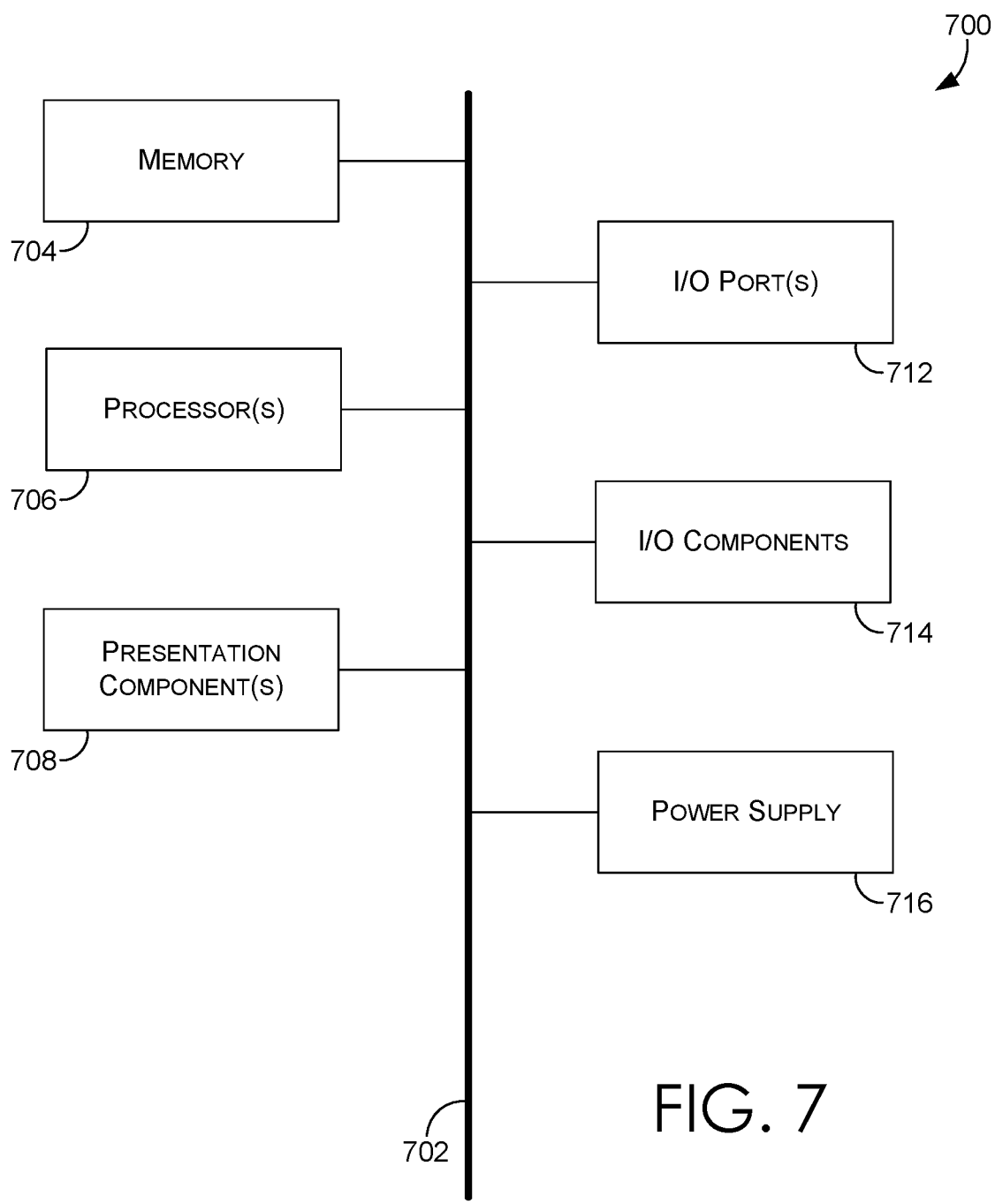
FIG. 7 depicts an exemplary computing device suitable for use in implementations of aspects herein.

Referring to FIG. 7, a block diagram of an example of a computing device 700 suitable for use in implementations of the technology described herein is provided. In particular, the exemplary computer environment is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 7, computing device 700 includes a bus 702 that directly or indirectly couples various components together. The bus 702 may directly or indirectly one or more of memory 704, processor(s) 706, presentation component(s) 708 (if applicable), input/output (I/O) port(s) 712, input/output (I/O) component(s) 714, and/or power supply 716. Although the components of FIG. 7 are shown with lines for the sake of clarity, in reality, delineating various components is not so clear, and metaphorically, the lines would more accurately be grey and fuzzy. For example, one may consider a presentation component(s) 708 such as a display device to be one of I/O components 714. Also, the processor(s) 706 may include memory 704, in another example. The present disclosure hereof recognizes that such is the nature of the art, and reiterates that FIG. 7 is merely illustrative of an example of a computing device 700 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 704 may take the form of memory components described herein. Thus, further elaboration will not be provided here, but it should be noted that memory 704 may include any type of tangible medium that is capable of storing information, such as a database or data store. A database or data store may be any collection of records, files, or information encoded as electronic data and stored in memory 704, for example. In one embodiment, memory 704 may include a set of embodied computer-readable and executable instructions that, when executed, facilitate various functions or elements disclosed herein. These embodied instructions will variously be referred to as "instructions" or an "application" for short.

Processor(s) 706 may be multiple processors that receive instructions and process them accordingly. Presentation component(s) 708, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

A wireless telecommunication network might include an array of devices, which are not shown so as to not obscure more relevant aspects of the invention. Components such as a base station, a communications tower, or even access points (as well as other components) can provide wireless connectivity in some embodiments.

The input/output (I/O) ports 712 may take a variety of forms. Exemplary I/O ports 712 may include a USB jack, a stereo jack, an infrared port, a firewire port, other proprietary communications ports, and the like. Input/output (I/O) components 714 may comprise keyboards, microphones, speakers, touchscreens, and/or any other item usable to directly or indirectly input data into the computing device 700.

Power supply 716 may include batteries, fuel cells, and/or any other component that may act as a power source to supply power to the computing device 700 or to other network components, including through one or more electrical connections or couplings. Power supply 716 may be configured to selectively supply power to different components independently and/or concurrently.

Finally, regarding FIGS. 1 through 7, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and subcombinations are of utility and may be employed without reference to other features and subcombinations and are contemplated within the scope of the claims.

The invention claimed is:

1. A method in a communication network, the method comprising:
    receiving a set of alarms from a plurality of nodes, the set of alarms representing a plurality of incidents;
    analyzing description data associated with the set of alarms;
    based on the analyzing, determining, using an engine, a plurality of subsets of the set of alarms, each subset representing an incident of the plurality of incidents;
    determining, using a machine learning model trained to predict likelihoods that alarms are root causes of incidents, likelihoods that alarms of each subset of the plurality of subsets are root causes of incidents of the plurality of incidents;
    selecting a plurality of alarms of the set of alarms based at least on the likelihoods that said plurality of alarms are the root causes of the incidents;
    determining a shortest path distance between root causes of the plurality of incidents; and
    causing the shortest path distance between the root causes of the plurality of incidents to be displayed at a graphical user interface.

2. The method of claim 1, wherein the description data associated with the set of alarms is generated based at least in part by converting a plurality of Internet Protocol (IP) addresses to a plurality of node names.

3. The method of claim 1, wherein the root causes are associated with nodes of the plurality of nodes.

4. A system in a communication network, the system comprising:
    one or more processors; and
    one or more computer storage hardware devices storing computer-usable instructions that, when used by the one or more processors, cause the one or more processors to:
        receive a set of alarms from a plurality of nodes, the set of alarms representing a plurality of incidents;
        analyze description data associate with the set of alarms;
        based on the analysis, determine a first plurality of subsets of the set of alarms, each subset representing an incident of the plurality of incidents;
        determine, using a machine learning model trained to predict likelihoods that alarms are root causes of incidents, likelihoods that alarms of each subset of the plurality of subsets are root causes of incidents of the plurality of incidents;
        select a plurality of alarms of the set of alarms based at least on the likelihoods that said plurality of alarms are the root causes of the incidents;
        determine a shortest path distance between root causes of the plurality of incidents; and
        causing the shortest path distance between the root causes of the plurality of incidents to be displayed at a graphical user interface.

5. The system of claim 4, wherein the description data associated with the set of alarms is generated in part by converting a plurality of Internet Protocol (IP) addresses to a plurality of node names.

6. The system of claim 4, wherein the root causes are nodes of the plurality of nodes.

7. The system of claim 4, wherein the root causes are problems associated with nodes of the plurality of nodes.

8. A method in a communication network, the method comprising:
    receiving a set of alarms from a plurality of nodes, the set of alarms representing a plurality of incidents;
    analyzing description data associated with the set of alarms;
    based on the analyzing, determining a subset of the set of alarms representing a first incident of the plurality of incidents;
    generating, by applying the subset to a machine learning model trained to predict likelihoods that alarms are root causes of incidents, one or more predictions regarding a first root cause of the first incident;
    selecting a first alarm of the subset based at least on the one or more predictions;
    determining a shortest path distance between the first root cause and a second root cause of a second incident of the plurality of incidents; and
    causing the shortest path distance between the first root cause and the second root cause to be displayed at a graphical user interface;
    updating parameters of the machine learning model based on an actual root cause of the first incident.

9. The method of claim 8, wherein the description data associated with the set of alarms is generated in part by converting a plurality of Internet Protocol (IP) addresses to a plurality of node names.

10. The method of claim 8, wherein the first root cause is a root cause device.

11. The method of claim 8, wherein the first root cause is a problem associated with a root cause device.

12. The method of claim 8, further comprising selecting a second alarm of the set of alarms based on a prediction by the machine learning model that the second alarm is the second root cause of the second incident of the plurality of incidents.

* * * * *